(12) United States Patent
Oh

(10) Patent No.: US 11,851,067 B2
(45) Date of Patent: Dec. 26, 2023

(54) VEHICLE DRIVING PATH GENERATION AND CONTROL BASED ON OTHER VEHICLE LATERAL OFFSETS

(71) Applicants: Hyundai Motor Company, Seoul (KR); Kia Corporation, Seoul (KR)

(72) Inventor: Tae Dong Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 133 days.

(21) Appl. No.: 17/372,792

(22) Filed: Jul. 12, 2021

(65) Prior Publication Data

US 2022/0063629 A1 Mar. 3, 2022

(30) Foreign Application Priority Data

Sep. 1, 2020 (KR) .......................... 10-2020-0111048

(51) Int. Cl.
*B60W 40/04* (2006.01)
*G08G 1/01* (2006.01)

(52) U.S. Cl.
CPC .............. *B60W 40/04* (2013.01); *G08G 1/01* (2013.01); *B60W 2552/00* (2020.02); *B60W 2554/4041* (2020.02); *B60W 2554/4042* (2020.02); *B60W 2554/4043* (2020.02); *B60W 2554/801* (2020.02); *B60W 2554/803* (2020.02); *B60W 2554/804* (2020.02)

(58) Field of Classification Search
CPC ..... G08G 1/01; B60W 40/04; B60W 2552/00
See application file for complete search history.

(56) References Cited

U.S. PATENT DOCUMENTS 11,560,159 B2 * 1/2023 Tao ...................... G05D 1/0214
2017/0316684 A1 * 11/2017 Jammoussi .......... G08G 1/0112
2018/0118264 A1 * 5/2018 Adiprasito ........... B62D 15/025
(Continued)

FOREIGN PATENT DOCUMENTS

DE 102015015302 A1 * 5/2016 ............ B60W 30/12
WO WO-2022083970 A1 * 4/2022

OTHER PUBLICATIONS

Machine translation of WO-2022083970-A1 (Year: 2022).*
Machine translation of DE 102015015302 A1 (Year: 2016).*

*Primary Examiner* — Hussein Elchanti
*Assistant Examiner* — Kenneth M Dunne
(74) *Attorney, Agent, or Firm* — MORGAN, LEWIS & BOCKIUS LLP

(57) ABSTRACT

A driving control apparatus and method may include collecting driving information related to a subject vehicle, wherein the driving information related to the subject vehicle includes a driving lane and a vehicle width of the subject vehicle, and driving information related to another vehicle, wherein the driving information related to another vehicle includes a driving lane and a vehicle width of at least one another vehicle around the subject vehicle, generating one or more imaginary lines indicating positions in a corresponding driving lane of the another vehicle based on the driving information related to the another vehicle, determining a deflection value by which the subject vehicle needs to be deflected in the driving lane of the subject vehicle based on the imaginary line, and determining a driving path of the subject vehicle based on the determined deflection value.

19 Claims, 22 Drawing Sheets

(56) References Cited

U.S. PATENT DOCUMENTS

| | | | |
|---|---|---|---|
| 2018/0286242 A1* | 10/2018 | Talamonti | B62D 15/025 |
| 2019/0256083 A1* | 8/2019 | Kang | B60W 30/09 |
| 2020/0218261 A1* | 7/2020 | Zidek | G07C 5/0808 |
| 2021/0020045 A1* | 1/2021 | Huang | G01C 21/3804 |
| 2021/0094539 A1* | 4/2021 | Beller | G08G 1/167 |
| 2021/0389153 A1* | 12/2021 | Zhen | G01C 21/3889 |
| 2022/0017112 A1* | 1/2022 | Liu | B60W 60/0011 |

* cited by examiner

CLUSTER 1

Lane 1　　Lane 2　　Lane 3

VEHICLE DRIVING PATH GENERATION AND CONTROL BASED ON OTHER VEHICLE LATERAL OFFSETS

The present application claims priority to Korean Patent Application No. 10-2020-0111048, filed on Sep. 1, 2020, the entire contents of which is incorporated herein for all purposes by this reference.

BACKGROUND OF THE PRESENT INVENTION

Field of the Invention

The present invention relates to a driving control apparatus and method for easily determining a deflection value while deflection driving and improving driving stability and ride comfort.

Description of Related Art

In general, an autonomous vehicle recognizes opposite lines of a driving lane and drives in the center portion of the recognized opposite lines. Furthermore, the autonomous vehicle generates a candidate path within the lane in consideration of nearby vehicles or obstacles, and to avoid collision with obstacles and ensure safety, the autonomous vehicle may drive deflected from the center portion of the lane by selecting a local path within a range that does not deviate from the lines.

In the case of conventional deflection driving, a deflection value is determined using a distance greater than a safe distance from nearby vehicles as a parameter. Such a conventional deflection driving method has a problem in that, as a vehicle and a road become more complex, the complexity of the logic for determining the deflection value increases and when a driving environment such as normal driving, lane change, and an intersection changes, a driving path unnaturally fluctuates due to discontinuities in the deflection value. If a degree of invasion of a line is used as a reference, there is a problem in that a subject vehicle does not react in advance even if the subject vehicle is expected to be closer to other vehicles in a section in which the width of a lane is narrow.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a driving control apparatus and method for determining a deflection value using a simple method even on a road on which various vehicles are present in complex patterns.

Even if a driving environment is changed, for example, in the case of a straight road, a curved road, lane change, and an intersection, a smooth driving state may be maintained by applying the same parameter and continuously determining the deflection value.

The technical problems solved by the exemplary embodiments are not limited to the above technical problems and other technical problems which are not described herein will become apparent to those skilled in the art from the following description.

To achieve these objects and other advantages and in accordance with the present invention, as embodied and broadly described herein, a driving control method includes collecting driving information related to a subject vehicle, wherein the driving information related to the subject vehicle includes a driving lane and a vehicle width of the subject vehicle, and driving information related to another vehicle, wherein the driving information related to another vehicle includes a driving lane and a vehicle width of at least one another vehicle around the subject vehicle, generating one or more imaginary lines indicating positions in a corresponding driving lane of the another vehicle based on the driving information related to the another vehicle, determining a deflection value by which the subject vehicle needs to be deflected in the driving lane of the subject vehicle based on the imaginary line, and determining a driving path of the subject vehicle based on the determined deflection value.

In another aspect of the present invention, a driving control apparatus includes a first determiner configured to collect driving information related to a subject vehicle, wherein the driving information related to the subject vehicle includes a driving lane and a vehicle width of the subject vehicle, and driving information related to another vehicle, wherein the driving information related to another vehicle includes a driving lane and a vehicle width of at least one another vehicle around the subject vehicle, a second determiner configured to generate one or more imaginary lines indicating positions in a corresponding driving lane of the another vehicle based on the driving information related to the another vehicle, to determine a deflection value by which the subject vehicle needs to be deflected in the driving lane of the subject vehicle based on the imaginary line, and to determine a driving path of the subject vehicle based on the deflection value, and a driving controller configured to control of the subject vehicle based on the determined driving path.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
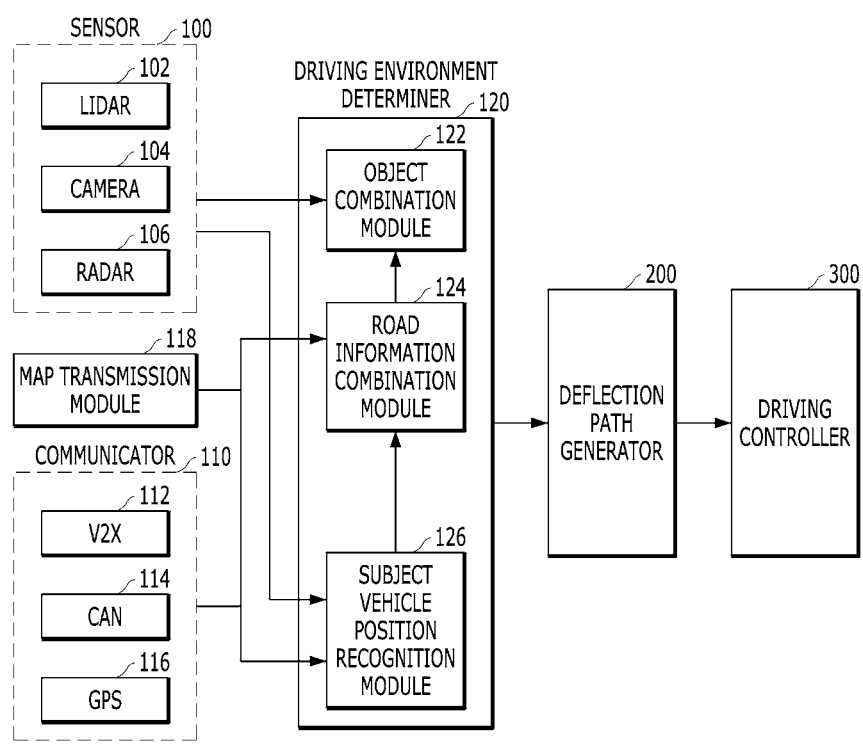
FIG. 1 is a schematic block diagram of a driving control apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, the exemplary embodiments of the present invention will be described in detail with reference to the accompanying drawings to be easily implemented by those skilled in the art. However, the present invention may be variously implemented, and is not limited to the exemplary embodiments described herein. In the drawings, to clearly describe the present invention, portions which are not related to the description of the present invention will be omitted, and similar portions are denoted by similar reference numerals throughout the specification.

Throughout the specification, when a certain portion is the to "include" a certain component, this does not indicate that other components are excluded, and the same may be further included unless described to the contrary. The same reference numbers will be used throughout the drawings to refer to the same or like parts.

According to various exemplary embodiments of the present invention, a deflection value corresponding to a degree by which a subject vehicle needs to be deflected may be determined based on the distance by which another vehicle deviates from an adjacent lane, the width of a lane, and the width of a vehicle by considering that the reason for deflection driving is that a surface of another vehicle gets closer to a lane in which the subject vehicle drives. Here, a deflection path may be effectively and intuitively generated using control points of a subject vehicle, formed by generating an imaginary vehicle in an opposite lane symmetric to another vehicle with respect to the subject vehicle and then connecting midpoints of contour points of both the other vehicle and the imaginary vehicle to each other. Accordingly, even if various vehicles are present in complex patterns, it may be possible to perform autonomous driving along a smooth deflection path like manual driving of an actual driver, thereby improving ride comfort and driving stability.

Hereinafter, an apparatus configured for apparatus of controlling driving of a vehicle according to various exemplary embodiments of the present invention will be described with reference to the drawings. First, main terms used in the specification and the drawings will be described.

Subject vehicle: My own vehicle

Another vehicle, other vehicles: A vehicle except for the subject vehicle

Nearby vehicle: A vehicle except for the subject vehicle, detected by a sensor provided in the subject vehicle Preceding vehicle: A nearby vehicle driving right in front of the subject vehicle Driving lane: A lane in which the subject vehicle currently drives Target lane: A lane to which the subject vehicle intends to move Target lane vehicle: A nearby vehicle driving in the target lane FIG. 1 is a schematic block diagram of a driving control apparatus according to various exemplary embodiments of the present invention.

Referring to FIG. 1, the driving control apparatus according to various exemplary embodiments of the present invention may include a sensor 100, a communicator 110, a map transmission module 118, a driving environment determiner 120, a deflection path generator 200, and a driving controller 300.

The sensor 100 may detect at least one nearby vehicle positioned at front, lateral, and rear sides of the subject vehicle and may detect a position, a speed, and an acceleration of each nearby vehicle. The sensor 100 may include various sensors provided at the front, lateral, and rear sides of the subject vehicle, including a Light Detection and Ranging (LiDAR) 102, a camera 104, and a radar 106.

The LiDAR 102 may measure a distance between the subject vehicle and the nearby vehicle. The LiDAR 102 may determine spatial location coordinates of a reflection point by measuring a time of arrival of a laser pulse reflected from the nearby vehicle and may check the distance to the nearby vehicle, the shape of the nearby vehicle, and the like.

The camera 104 may acquire an image of a region around the subject vehicle through an image sensor. The camera 104 may include an image processor for performing image processing, such as noise removal, image quality and saturation adjustment, and file compression, on the acquired image.

The radar 106 may measure the distance between the subject vehicle and the nearby vehicle. The radar 106 may check information including the distance, direction, and elevation with respect to the nearby vehicle by emitting an electromagnetic wave toward the nearby vehicle and receiving the electromagnetic wave reflected from the nearby vehicle.

The communicator 110 may receive plural pieces of information for detecting the positions of the subject vehicle and other vehicles. The communicator 110 may include various devices for receiving plural pieces of information for recognizing the position of the subject vehicle, including a vehicle to everything (V2X) 112, a controller area network (CAN) 114, and a global positioning system (GPS) 116.

The map transmission module 118 may provide a detailed map for differentiating between lanes. The detailed map may be stored in a form of a database (DB), may be automatically updated at regular intervals using wireless communication or manually updated by a user, and may include information on a merge section for each lane (e.g., which includes information on the position of the merge section and information on a legal maximum speed of each merge section), information on a road for each position, information on an off-ramp, and information on an intersection.

The driving environment determiner 120 may combine object information related to the subject vehicle and other vehicles with the detailed map based on the information acquired through the sensor 100, the map transmission module 118, and the communicator 110 and may output the result. The driving environment determiner 120 may include an object combination module 122, a road information combination module 124, and a subject vehicle position recognition module 126.

The subject vehicle position recognition module 126 may output detailed position information related to the subject vehicle. The subject vehicle position recognition module 126 may compare information detected by the sensor 100 with Global Positioning System (GPS) information related to the subject vehicle, collected through the communicator 110, and detailed map information provided by the map transmission module 118 and may output position information and position recognition reliability information related to the subject vehicle together.

The road information combination module 124 may output a detailed map of a region around the subject vehicle. The road information combination module 124 may output information on a detailed map of a region around the subject vehicle to the object combination module 122 using position recognition information and detailed map information.

The object combination module 122 may output combination object information to the deflection path generator 200. The object combination module 122 may combine an object with the detailed map using the information detected by the sensor 100 and the information on the detailed map of the region around the subject vehicle and may output the result.

The deflection path generator 200 may generate a deflection path by receiving information obtained by combining an object with the detailed map and determining a deflection target object causing deflection among nearby vehicles that drive around the subject vehicle and determining a deflection value by which the subject vehicle needs to be deflected based on the distance by which the selected vehicle deviates from an adjacent lane, the width of a lane, and the width of a vehicle. The driving controller 300 may determine a driving path of the subject vehicle and may control a driving state based on the deflection path output from the deflection path generator 200. The deflection path generator 200 and the driving controller 300 may be configured as shown in block diagrams of FIG. 2 and FIG. 3.

Figure 2:
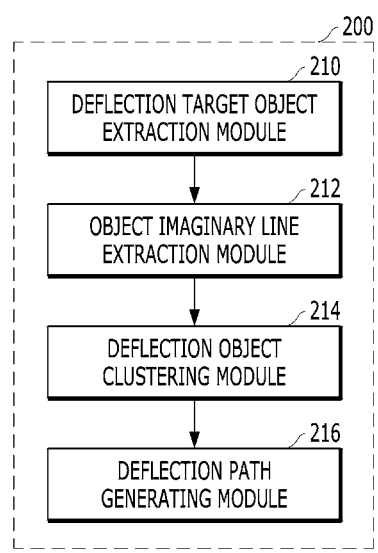
FIG. 2 is a block diagram showing an example of the configuration of a deflection path generator of FIG. 1.

FIG. 2 is a block diagram showing an example of the configuration of the deflection path generator 200 of FIG. 1.

The deflection path generator 200 may generate the deflection path by determining the deflection value by which the subject vehicle needs to be deflected using the distance by which the selected vehicle deviates from an adjacent lane, the width of a lane, and the width of a vehicle based on the object combination detailed map output from the driving environment determiner 120.

Referring to FIG. 2, the deflection path generator 200 may include a deflection target object extraction module 210, an object imaginary line extraction module 212, a deflection object clustering module 214, and a deflection path generating module 216.

The deflection target object extraction module 210 may extract a deflection target object causing deflection of the subject vehicle among objects combined with the detailed map. Input of the deflection target object extraction module 210 may be combined information related to the position/speed/map information related to a nearby vehicle of the subject vehicle. When an object driving in an adjacent lane of the subject vehicle drives to deviate from the center portion of the corresponding lane and to be deflected toward the subject vehicle, the deflection target object extraction module 210 may extract the object as the deflection target object.

The object imaginary line extraction module 212 may extract a closest point of each of the extracted deflection target objects to a driving lane of the subject vehicle and may output an imaginary line parallel to the driving lane of the subject vehicle based on the closest point to the driving lane of the subject vehicle. The imaginary line extracted by the object imaginary line extraction module 212 may be used as a reference line when the deflection value is determined.

The deflection object clustering module 214 may group the deflection target objects according to a preset reference. The deflection path may be prevented from being unnaturally generated by processing a plurality of deflection target objects to one group according to a preset reference.

The deflection path generating module 216 may output a deflection path corresponding to a set of final deflection values through the deflection object cluster information. Input of the deflection path generating module 216 may correspond to the number of clusters and information on each cluster. When the final deflection path is determined, the deflection path generating module 216 may generate the deflection path in a form of a curve formed by smoothly connecting midpoints of an imaginary line of a left closest lane to the driving lane of the subject vehicle and an imaginary line of a right closest lane thereto in the cluster with the driving lane of the subject vehicle.

Figure 3:
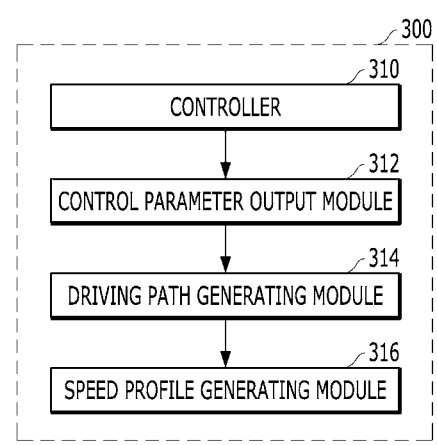
FIG. 3 is a block diagram showing an example of the configuration of a driving controller of FIG. 1.

FIG. 3 is a block diagram showing an example of the configuration of the driving controller 300 of FIG. 1. The driving controller 300 may control autonomous driving of the subject vehicle based on the deflection path determined by the deflection path generator 200.

Referring to FIG. 3, the driving controller 300 may include a speed profile generating module 316, a driving path generating module 314, a control parameter output module 312, and a controller 310.

The speed profile generating module 316 may generate a final speed profile based on the deflection path input by the deflection path generating module 216.

The driving path generating module 314 may output the final driving path based on the speed profile generated by the speed profile generating module 316 and the deflection path input by the deflection path generating module 216.

The control parameter output module 312 may output a control parameter to be actually transmitted as input of a controller based on the driving path and the speed profile that are output by the driving path generating module 314. Thus, the controller 310 may control autonomous driving of a vehicle according to the control parameter.

Figure 4:
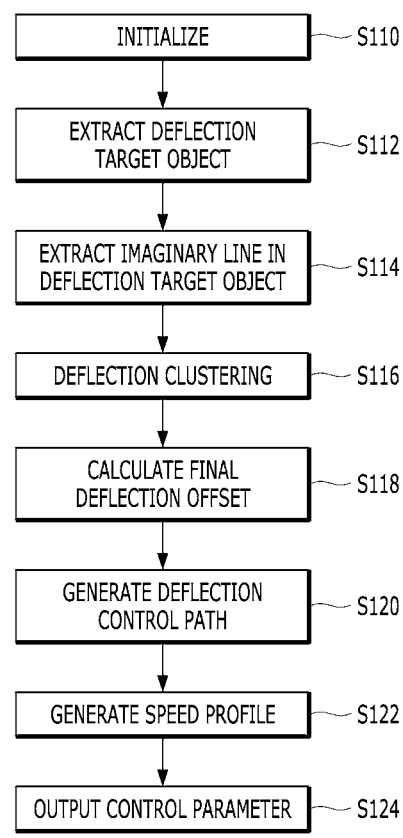
FIG. 4 is a schematic flowchart of a driving control method according to various exemplary embodiments of the present invention.

FIG. 4 is a schematic flowchart of a driving control method according to various exemplary embodiments of the present invention.

After being initialized to determine a deflection value in a deflection section (S110), the deflection path generator 200 may extract a deflection target object from a detailed map with which an object is combined (S112). The deflection target object may be an object that causes deflection of the subject vehicle among objects combined with the detailed map. For example, another vehicle which is close to a line of a driving lane of the subject vehicle by a distance less than a reference distance may be extracted as the deflection target object among objects that drive in an adjacent lane to a driving lane of the subject vehicle.

The deflection path generator 200 may extract an imaginary line based on the extracted deflection target object (S114). The imaginary line may be generated parallel to the line of the driving lane of the subject vehicle based on the closest point of the driving lane of the subject vehicle to the deflection target objects.

Accordingly, adjacent deflection target objects may be grouped into one group and deflection clustering may be performed (S116).

Final deflection offset may be determined for each clustered group (S118).

A deflection control path in the driving lane of the subject vehicle may be generated by applying the determined deflection offset value (S120).

A speed profile for driving the deflection control path may be generated (S122).

A control parameter may be output according to the generated speed profile (S124).

As described above, in the driving control method according to various exemplary embodiments of the present invention, an imaginary line may be generated based on a deflection target vehicle that deviates from the center portion of a lane among other vehicles that drive around the subject vehicle, and a deflection control path in the driving lane of the subject vehicle may be generated along an imaginary line, and accordingly, a smooth deflection path may be easily generated even if various vehicles are present in complex patterns.

Figure 5:
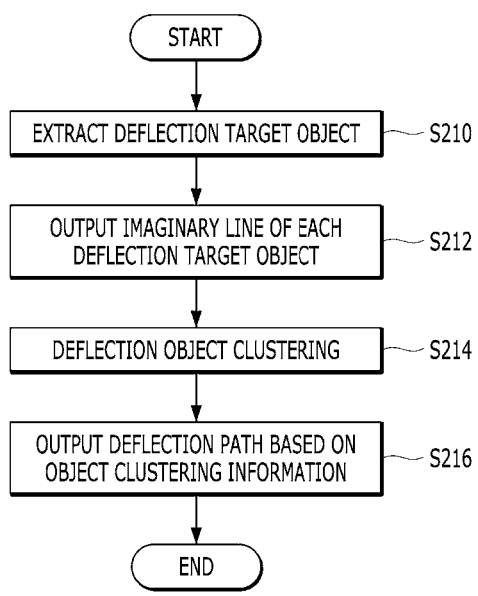
FIG. 5 is a control flowchart of a deflection path generator according to various exemplary embodiments of the present invention.

FIG. 5 is a control flowchart of the deflection path generator 200 according to various exemplary embodiments of the present invention.

The deflection path generator 200 may extract an object that causes deflection of the subject vehicle among objects combined with the detailed map (S210). The deflection path generator 200 may extract the object that causes deflection of the subject vehicle from combined information related to the position/speed/map of an adjacent vehicle to the subject vehicle and may output a list of the extracted object.

When the deflection target object is extracted, an imaginary line parallel to a line of the driving lane of the subject vehicle may be output based on the closest point of each of the deflection target objects to the subject vehicle (S212). Accordingly, an external side of the imaginary line from the driving lane of the subject vehicle may be processed as a region occupied by the deflection target object.

Accordingly, the deflection target objects may be clustered as one group according to a predetermined reference (S214). For example, when a distance between the deflection target objects is smaller than a threshold value, the deflection target objects may be clustered into one cluster.

The deflection path generator 200 may lastly output the deflection path base on the deflection object cluster information (S216).

Figure 6:
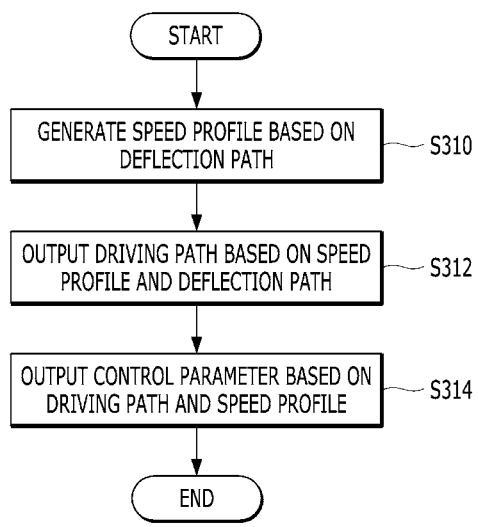
FIG. 6 is a control flowchart of a driving controller according to various exemplary embodiments of the present invention.

FIG. 6 is a control flowchart of the driving controller 300 according to various exemplary embodiments of the present invention.

The driving controller 300 may generate a speed profile based on the deflection path input from the deflection path generator 200 (S310).

The driving path may be generated based on the generated speed profile and the deflection path input from the deflection path generator 200 (S312).

A control parameter to be input to a controller may be generated based on the driving path and the speed profile (S314).

Figure 7:
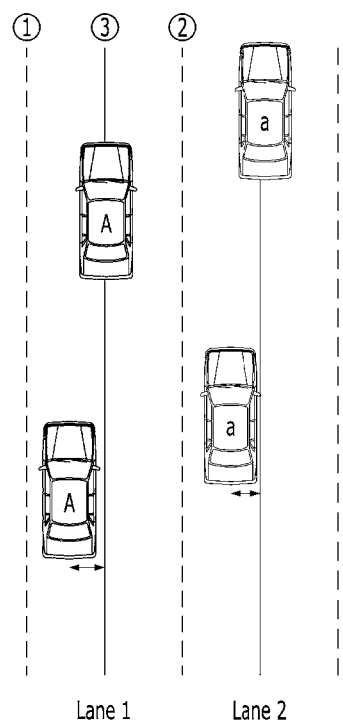
FIG. 7, FIG. 8 and FIG. 9 are diagrams for explaining a method of extracting a deflection target object according to various exemplary embodiments of the present invention.
Figure 8:
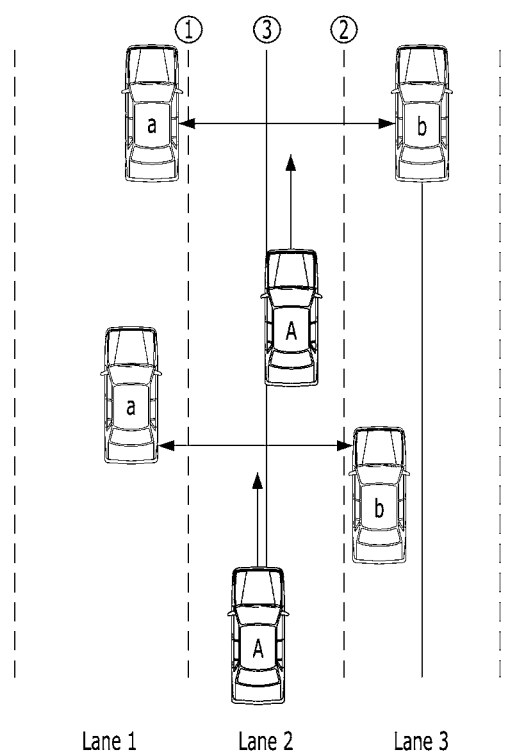
Figure 9:
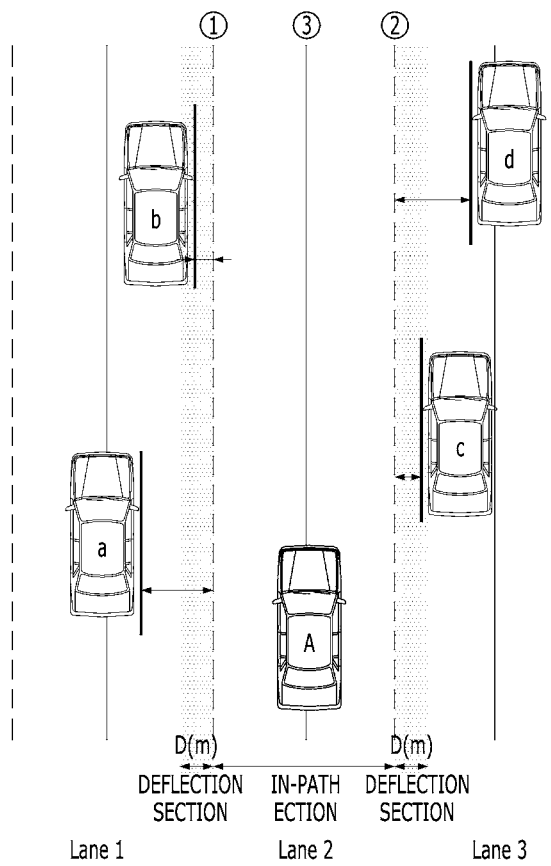

FIG. 7, FIG. 8 and FIG. 9 are diagrams for explaining a method of extracting a deflection target object according to various exemplary embodiments of the present invention.

First, with reference to FIGS. 7 and 8, the reason of deflection driving of a driver and a principle of generating a deflection path will be described.

FIG. 7 illustrates an example of the state in which a subject vehicle A drives in a first lane Lane1 and another vehicle a drives in a second lane Lane2. When the other vehicle a of the second lane Lane2 drives along the center portion of a lane, the subject vehicle A may also drive along the center portion ③ of the first lane Lane1. In contrast, when the other vehicle a of the second lane Lane2 drives to deviate from the center portion of the corresponding lane and to be deflected towards an adjacent lane line ② of the subject vehicle A or drives close to the adjacent lane line ② due to a great width of the other vehicle a, the subject vehicle A may also drive to deviate from the corresponding lane and to be deflected towards a lane line ① away from the other vehicle a.

FIG. 8 illustrates an example of the case in which other vehicles a and b drive at opposite sides of the subject vehicle A. When the other vehicles a and b at the opposite sides drive to be deflected, the subject vehicle A may drive along a path having the minimum spatial risk. That is, the subject vehicle A may drive to be deflected along a path passing through the middle portion of the two vehicles a and b within a range in which the subject vehicle A does not deviate from the lane lines ① and ② of the driving lane Lane2.

Accordingly, a vehicle that drives to deviate from the center portion of a lane and to be deflected toward a driving lane of the subject vehicle among other vehicles that drive in adjacent lanes may be processed as an object that causes deflection driving.

FIG. 9 is a diagram for explaining a method of extracting a deflection target object according to various exemplary embodiments of the present invention.

The deflection target object extraction module 210 for extracting the deflection target object may receive information obtained by combining the position and speed of an adjacent vehicle of the subject, and information on a detailed map from the driving environment determiner 120. To extract the deflection target object, the deflection target object extraction module 210 may check whether a driving lane of neighboring vehicles a, b, c, and d of the subject vehicle A is adjacent lanes Lane1 and Lane3 to the driving lane Lane2 of the subject vehicle. When the neighboring vehicles a, b, c, and d are checked, the vehicles c and d that approach the lane lines ① and ② of the driving lane Lane2 of the subject vehicle A within a reference distance D(m) may be extracted as the deflection target object.

The reference distance D(m) may be variously set depending on the width of a lane, the characteristics of the lane, and the like. To increase accuracy of extraction of the deflection target object, vehicles that invade n samples or more among N samples may be extracted as the deflection target object. The deflection target object extraction module 210 may generate and output a list of deflection target objects, that is, target vehicles from which the subject vehicle needs to be deflected.

Figure 10:
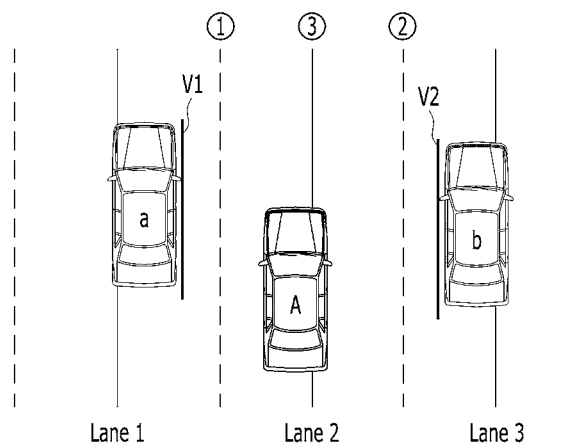
FIG. 10, FIG. 11, FIG. 12, and FIG. 13 are diagrams for explaining a method of generating an imaginary line according to various exemplary embodiments of the present invention.
Figure 11:
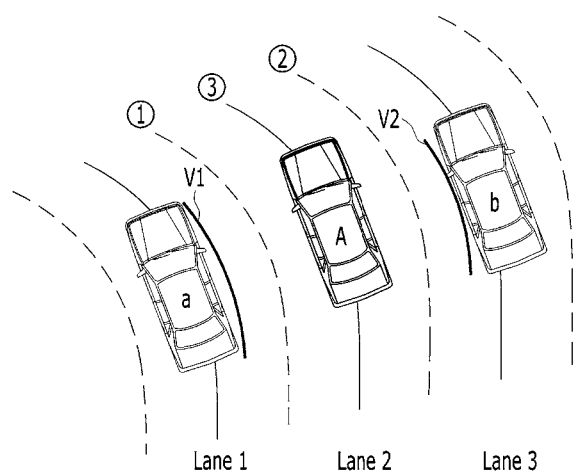
Figure 12:
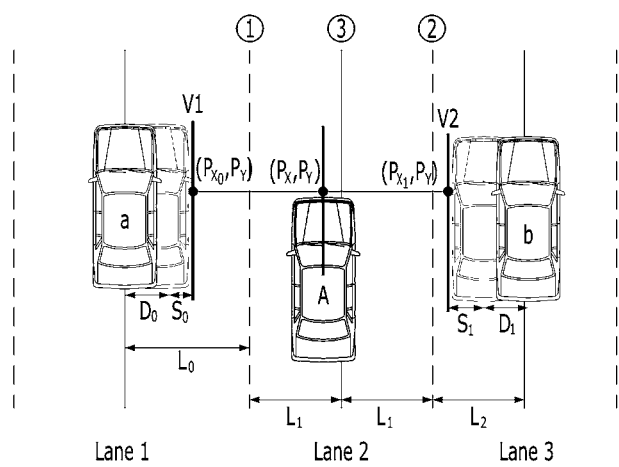
Figure 13:
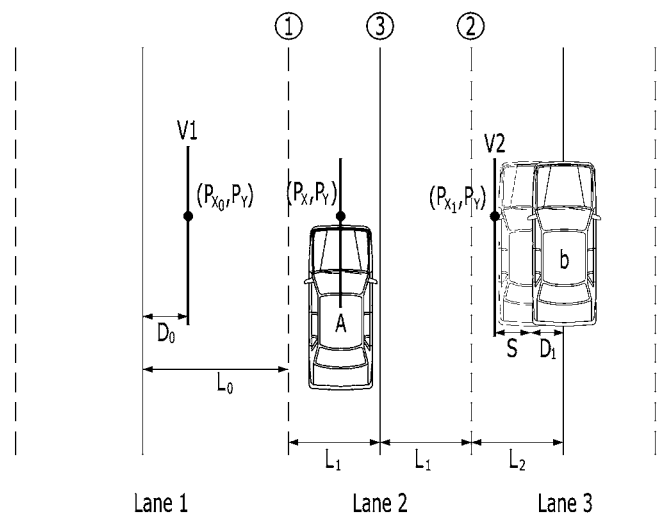

FIG. 10, FIG. 11, FIG. 12, and FIG. 13 are diagrams for explaining a method of generating an imaginary line according to various exemplary embodiments of the present invention. The object imaginary line extraction module 212 may generate an imaginary line by receiving a list of deflection target objects, that is, target vehicles from which the subject vehicle needs to be deflected, from the deflection target object extraction module 210. FIG. 10 illustrates a method of generating an imaginary line when a vehicle drives on a straight road. FIG. 11 illustrates a method of generating an imaginary line when a vehicle drives on a curved road. FIG. 12 illustrates a method of generating an imaginary line when other vehicles drive in opposite lanes. FIG. 13 illustrates a method of generating an imaginary line when another vehicle drives in one lane.

FIG. 10 is a diagram illustrating an example of an imaginary line generated when a vehicle drives on a straight road. FIG. 11 is a diagram illustrating an example of an imaginary line generated when a vehicle drives on a curved road.

Referring to FIG. 10, and FIG. 11, deflection target objects provided from the deflection target object extraction module 210 may be vehicles a and b that approach the lane lines ① and ② of the driving lane Lane2 of the subject vehicle A within a predetermined reference distance D(m).

The object imaginary line extraction module 212 may generate the straight line (refer to FIG. 10) or the curve (refer to FIG. 11) parallel to the driving lane Lane2 of the subject vehicle as object imaginary lines V1 and V2 based on the outermost points of the target vehicles a and b from which the subject vehicle A needs to be deflected, which are closest to the subject vehicle A.

Here, when an input value of the sensor 100, etc. is inaccurate and outlines of the target vehicles a and b from which the subject vehicle needs to be deflected frequently shake, it may be possible to apply an imaginary line obtained through parallel movement by as much as a predetermined width of a vehicle from the center portion of a rear bumper of an object.

The object imaginary line extraction module 212 may generate and output the imaginary lines V1 and V2 of the target vehicles a and b from which the subject vehicle A needs to be deflected, respectively. The imaginary lines V1 and V2 may be used to determine a value by which the subject vehicle A actually needs to be deflected.

FIG. 12 illustrates an example of a method of determining a midline of imaginary lines when other vehicles drive in opposite lanes. When vehicles are present at opposite sides, the subject vehicle may drive the center portion of both the vehicles.

When the target vehicles a and b from which the subject vehicle needs to be deflected drive in opposite lanes Lane1 and Lane3 of the driving lane Lane2 of the subject vehicle, the imaginary lines V1 and V2 may be generated based on the outermost lines of both the vehicles a and b, respectively. Thus, a midpoint of the imaginary lines V1 and V2 of both the vehicles a and b may be determined. Here, the midpoint may be determined using lane widths L0, L1, and L2 of both the vehicles a and b, vehicle widths D0 and D1, and distances S0 and S1 by which a vehicle deviates from lanes, which may be represented using Equation 1 below.

$$P_X = \frac{P_{X_0} + P_{X_1}}{2} \quad \langle \text{Equation 1} \rangle$$

-continued
$$\left( = \frac{(-L_1 - L_0 + D_0 + S_0) + (L_1 + L_2 - D_1 - S_1)}{2} \right)$$
$$\left( = \frac{(L_2 - L_0 + (D_0 - D_1) + (S_0 - S_1)}{2} \right)$$

Here, to reduce spatial risk, a deflection value may be adjusted such that, as the width of a lane of a section in which a vehicle drives is reduced, the vehicle drives to be more deflected in an opposite direction thereof. Furthermore, the deflection value may be adjusted such that, as the width of a vehicle is increased, the vehicle drives to be more deflected in an opposite direction thereof. The deflection value may be adjusted such that, as a vehicle drives to more deviate from a lane and to more approach the driving lane Lane2 of the subject vehicle, the vehicle drives to be more deflected in an opposite direction thereof. In contrast, deflection in an opposite direction to a valid direction may be disregarded. For example, even if the width of an opposite lane is wide, the subject vehicle may perform only required deflection rather than being deflected towards a corresponding lane.

FIG. 13 illustrates an example of a method of determining a midline of imaginary lines when another vehicle drives in one lane. When a vehicle is present only in one lane, an imaginary line may be generated at a position spaced from a lane by half of the width of a vehicle in an opposite lane.

When the target vehicle b from which the subject needs to be deflected drives in any one lane Lane3 based on the driving lane Lane2 of the subject vehicle, the imaginary line V2 may be generated based on the outermost line of the target vehicle b from which the subject vehicle needs to be deflected. The imaginary line V1 may be generated at a position spaced from the midline in the opposite lane Lane1 in which there is no vehicle. Thus, a degree by which the subject vehicle is deflected may be determined based on a distance S by which the deflection target object b deviates from the center portion of the lane Lane3 and the width of opposite lanes, which may be represented using Equation 2 below.

$$P_X = \frac{P_{X_0} + P_{X_1}}{2} \quad \langle \text{Equation 2} \rangle$$
$$= \frac{(-L_1 - L_0 - D_0 + S_0) + (L_1 + L_2 - D_1 - S_1)}{2}$$
$$= \frac{(L_2 - L_0) + (-S)}{2} \quad (\because D_0 = D_1, S_0 = 0 \cdot S_1 = S)$$

Here, deflection in an opposite direction to a valid direction may be disregarded. For example, even if the width of an opposite lane is wide, the subject vehicle may perform only required deflection rather than being deflected towards a corresponding lane.

Figure 14:
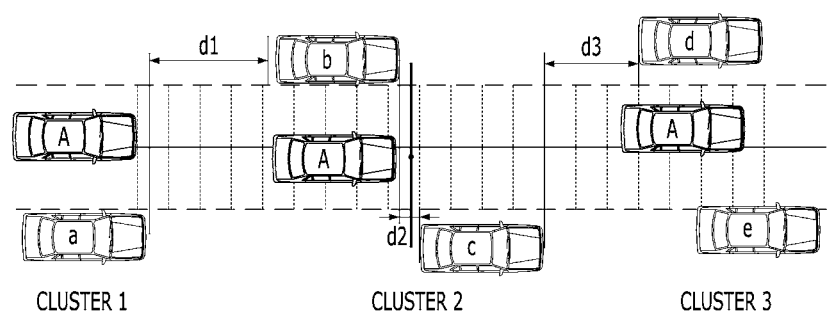
FIG. 14, FIG. 15 and FIG. 16 are diagrams for explaining a clustering method according to various exemplary embodiments of the present invention.
Figure 15:
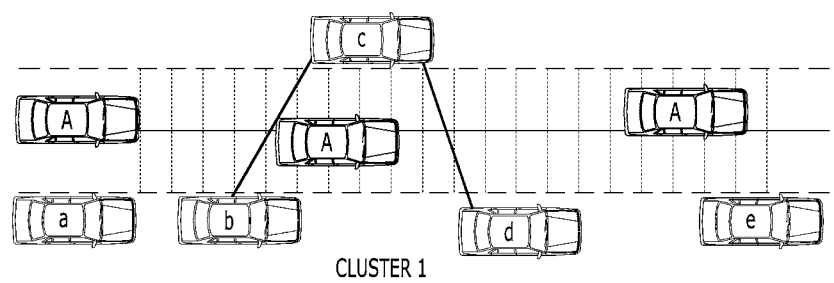
Figure 16:
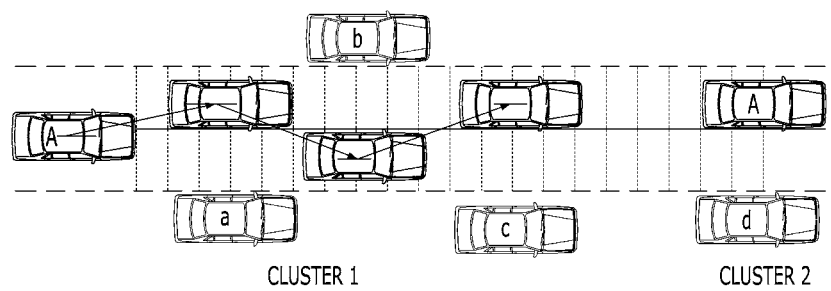

FIG. 14, FIG. 15 and FIG. 16 are diagrams for explaining a clustering method according to various exemplary embodiments of the present invention. The deflection object clustering module 214 may receive information on target vehicles from which the subject vehicle needs to be deflected and information on an imaginary line, from the object imaginary line extraction module 212. The deflection object clustering module 214 may perform clustering of grouping objects into one group based on a predetermined reference to prevent an unnatural deflection path from being generated in a zig-zag shape when a deflection value is determined for each object. The reference for clustering objects may be variously set. FIG. 14 is a diagram for explaining an exemplary embodiment in which clustering is performed based on a distance between objects. FIG. 15 is a diagram for explaining an exemplary embodiment in which clustering is performed based on left and right positions of objects. FIG. 16 is a diagram for explaining an exemplary embodiment in which clustering is performed based on an expected traverse speed of a subject vehicle.

FIG. 14 is a diagram for explaining a clustering method based on a distance between objects.

The deflection object clustering module 214 may group corresponding objects into one group when a distance between the deflection target objects is smaller than a threshold value. That is, when an $N^{th}$ deflection target object is present within a distance T(m) to an $(N+1)^{th}$ deflection target object, the two objects may be grouped into one object. When the $(N+1)^{th}$ deflection target object is present within a distance T(m) to an $(N+2)^{th}$ deflection target object, the $N^{th}$ $(N+1)^{th}$ and $(N+2)^{th}$ deflection target objects may be grouped into one object. In the method, clustering may be repeatedly performed on up to a total of N_max deflection target objects, and N_max may be extended to the number of all deflection target objects. After clustering is completed, a midline of an imaginary line of a left closest lane to the driving lane of the subject vehicle and an imaginary line of a right closest lane thereto in a cluster may be a factor when a deflection path is determined.

Referring to FIG. 14, clustering may be performed on neighboring vehicles a, b, c, d, and e to the driving lane of the subject vehicle A based on a distance between objects.

When a distance d1 between the vehicle a and the vehicle b closest thereto is greater than a threshold value Tm (d1>Tm), the two vehicles may be grouped into one cluster. Thus, the vehicle a may be classified as cluster 1 and the vehicle b may be classified as cluster 2.

When a distance d2 between the vehicle b and the vehicle c closest thereto is less than the threshold value Tm (d2<Tm), the two vehicles may be grouped into one cluster. Thus, the vehicle c together with the vehicle b may be classified as cluster 2.

When a distance d3 between the vehicle c and the vehicle d closest thereto is greater than the threshold value Tm (d3>Tm), the two vehicles may not be grouped into one cluster. Thus, the vehicle d may be classified as cluster 3.

When a distance between the vehicle e and the vehicle d is less than the threshold value Tm, the vehicle e together with the vehicle d may be classified as cluster 3.

As described above, when clustering is performed based on a distance between objects, clusters 1, 2, and 3 may be generated. When clustering is completed, the deflection object clustering module 214 may output information on the total number of clusters and information on each cluster to the deflection path generating module 216. A component of the cluster information may include the number of deflection target objects in a cluster, information (speed, position, and map information) on the deflection target object in a cluster, and information on an imaginary line. Accordingly, a midline of an imaginary line of the left closest lane to the driving lane of the subject vehicle and an imaginary line of the right closest lane thereto in the cluster may be a factor when the deflection path generating module 216 determines the deflection path.

FIG. 15 is a diagram for explaining a method of clustering objects positioned in left and right lanes.

The deflection object clustering module 214 may group two objects positioned on the left and right of the subject vehicle A into one cluster. When an $N^{th}$ deflection target object and an $(N+1)^{th}$ deflection target object are present in left and right lanes based on the driving lane of the subject vehicle, respectively, the two objects may be grouped into one cluster. When the $(N+1)^{th}$ deflection target object and the $(N+2)^{th}$ deflection target object are present in left and right lanes based on the driving lane of the subject vehicle, respectively, the $N^{th}$, $(N+1)^{th}$ and $(N+2)^{th}$ deflection target objects may be grouped into one cluster. In the present manner, clustering may be repeatedly performed on up to a total of N_max deflection target objects, and N_max may extend to the number of all deflection target objects. After clustering is completed, a midline of an imaginary line of a left closest lane to the driving lane of the subject vehicle and an imaginary line of a right closest lane thereto in a cluster may be a factor when a deflection path is determined.

Referring to FIG. 15, clustering may be performed on neighboring vehicles a, b, c, d, and e to the driving lane of the subject vehicle A based on left and right positions of objects.

Based on the subject vehicle A, the vehicle a is positioned on the right, but there is no vehicle on the right. Thus, the vehicle a may be excluded from clustering.

Based on the subject vehicle A, the vehicle b is positioned on the right, and the vehicle c is positioned on the left. Thus, the vehicle b and the vehicle c may be grouped into cluster 1.

Based on the subject vehicle A, the vehicle c is positioned on the left, and the vehicle d is positioned on the right. Thus, the vehicle d together with the vehicle c may be grouped into cluster 1.

Based on the subject vehicle A, the vehicle e is positioned on the right, but the vehicle e is positioned on the right. Thus, the vehicle e may be excluded from clustering.

As described above, cluster 1 may be generated by performing clustering based on objects positioned in left and right lanes.

FIG. 16 is a diagram for explaining a clustering method when an expected traverse speed of a subject vehicle is expected to be greater than a threshold value.

The deflection object clustering module 214 may perform clustering when the expected traverse speed of the subject vehicle is expected to be greater than a threshold value. When the subject vehicle separately responds to the $N^{th}$ deflection target object and the $(N+1)^{th}$ deflection target object, if the expected traverse speed of the subject vehicle is greater than a threshold value, the two objects may be grouped into one cluster. When the subject vehicle separately responds to the $(N+1)^{th}$ object and the $(N+2)^{th}$ deflection target object, if the expected traverse speed of the subject vehicle is greater than a threshold value, the $N^{th}$, $(N+1)^{th}$, and $(N+2)^{th}$ objects may be grouped into one cluster. In the present manner, clustering may be repeatedly performed on up to a total of N_max deflection target objects, and N_max may be extended to the number of all deflection target objects.

Referring to FIG. 16, the neighboring vehicles a, b, c, d, and e to the driving lane of the subject vehicle A may be clustered based on the expected traverse speed of the subject vehicle.

When the subject vehicle separately responds to the vehicle a and the vehicle b, if the expected traverse speed of the subject vehicle A is greater than a threshold value, the vehicle a and the vehicle b may be grouped into cluster 1.

When the subject vehicle separately responds to the vehicle b and the vehicle c, if the expected traverse speed of the subject vehicle A is greater than a threshold value, the vehicle c may also be grouped into cluster 1.

When the subject vehicle separately responds to the vehicle c and the vehicle d, if the expected traverse speed of the subject vehicle A is less than a threshold value, the vehicle d may be grouped into cluster 2.

As described above, clusters 1 and 2 may be generated by performing clustering based on the expected traverse speed of the subject vehicle.

The deflection object clustering module 214 may use one of the above three methods or may use two or more complementary combinations thereof. When clustering is completed, the deflection object clustering module 214 may output information on the total number of clusters and information on each cluster to the deflection path generating module 216. A component of the cluster information may include the number of deflection target objects in a cluster, information (speed, position, and map information) on the deflection target object in a cluster, and information on an imaginary line. Accordingly, a midline of an imaginary line of the left closest lane to the driving lane of the subject vehicle and an imaginary line of the right closest lane thereto in the cluster may be a factor when the deflection path generating module 216 determines the deflection path.

Figure 17:
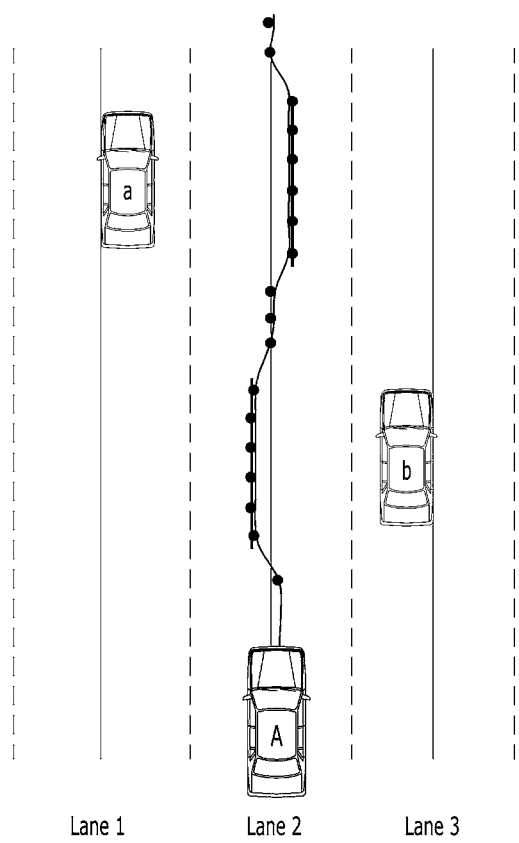
FIG. 17 is a diagram for explaining a method of determining a final deflection path.

FIG. 17 is a diagram for explaining a method of determining a final deflection path.

The deflection path generating module 216 may determine the final deflection path based on the number of clusters and information on each cluster. When the final deflection path is determined, the deflection path generating module 216 may generate the final deflection path in a form of a curve formed by smoothly connecting midpoints of an imaginary line of a left closest lane to the driving lane of the subject vehicle and an imaginary line of a right closest lane thereto in the cluster with the driving lane of the subject vehicle. A method of connecting the midline of imaginary lines and a lane may not be limited to a particular method, and various methods may be used. For example, a method, including Bezier Curve, B-spline Curve, NURBS, and cubic spline, which utilizes uniform points forming the midline of the imaginary lines and uniform points on the midline of the lane as a control point may be used to determine the final deflection path.

FIG. 18, FIG. 19, FIG. 20, FIG. 21 and FIG. 22 are diagrams showing examples of deflection paths generated in various driving environments.

Figure 18:
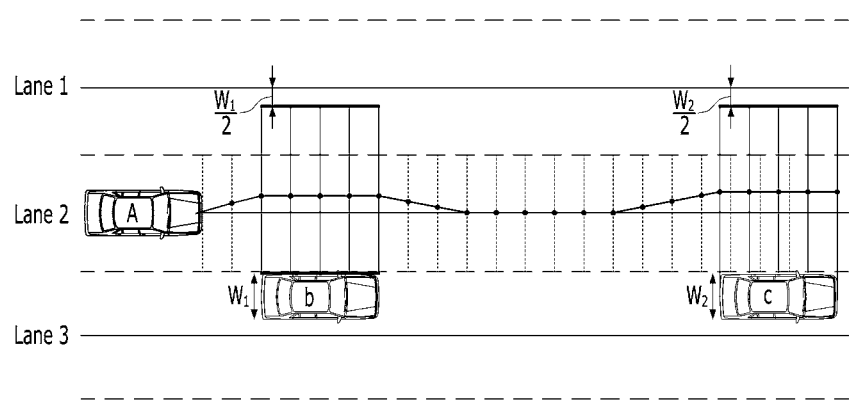
FIG. 18, FIG. 19, FIG. 20, FIG. 21 and FIG. 22 are diagrams showing examples of deflection paths generated in various driving environments.

FIG. 18 is a diagram showing an example of a deflection path generated when a deflection target object drives only in one lane.

When an object is present only on one side, the deflection path may be generated in consideration of an actual central driving environment of a vehicle instead of use of a safe distance parameter. When deflection target vehicles b and c drive in a right lane Lane3 based on the driving lane Lane2 of the subject vehicle, an imaginary line may be generated based on the outermost lines of the deflection target vehicles b and c. An imaginary line may be generated at a position spaced from the midline by half (W½) of the width (W1) of a vehicle in an opposite lane Lane1 in which there is no vehicle.

The final deflection path may be generated in a form of a curve formed by smoothly connecting the midline of the driving lane Lane2 of the subject vehicle and the midline of the imaginary line of Lane1 and the imaginary line of Lane3.

Figure 19:
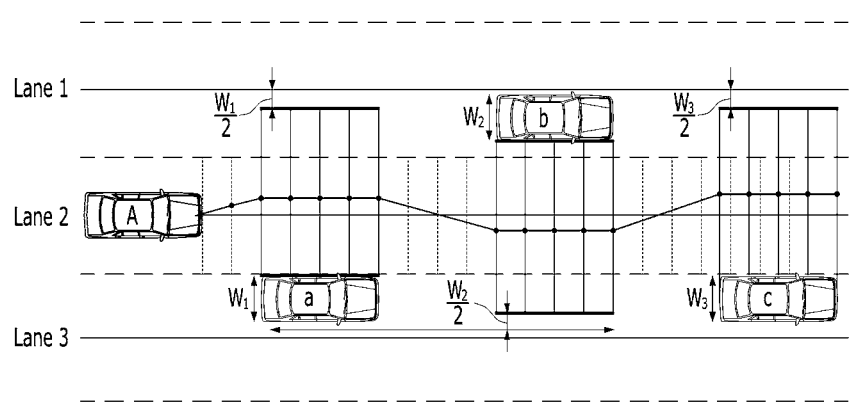

FIG. 19 is a diagram showing an example of a deflection path when deflection target objects drive in opposite lanes and each object drives to be spaced from the subject vehicle by a reference distance in a longitudinal direction thereof.

When a longitudinal distance d1 between the deflection target objects a and b that drive in opposite lanes is equal to or greater than a reference distance, the objects a and b may be determined to be independent objects.

When the objects a and b are determined to be independent objects, the deflection path may be generated by generating an imaginary line with respect to each of the case in which the deflection target vehicle a drives only in the right lane Lane3 based on the driving lane Lane2 of the subject vehicle and the case in which the deflection target vehicle b drives only in the left lane Lane1 based on the driving lane Lane2 of the subject vehicle.

That is, because the deflection target vehicle a drives in the right lane Lane3 based on the driving lane Lane2 of the subject vehicle, the imaginary line may be generated based on the outermost line of the deflection target vehicle a. The imaginary line may be generated at a position spaced from the midline by half (W½2) of the width (W1) of a vehicle in an opposite lane Lane1 in which there is no vehicle.

Because the deflection target vehicle a drives in the left lane Lane1 based on the driving lane Lane2 of the subject vehicle, the imaginary line may be generated based on the outermost line of the deflection target vehicle b. The imaginary line may be generated at a position spaced from the midline by half (W½) of the width (W1) of a vehicle in an opposite lane Lane3 in which there is no vehicle.

Because the deflection target vehicle c drives in the right lane Lane3 based on the driving lane Lane2 of the subject vehicle, the imaginary line may be generated based on the outermost line of the deflection target vehicle c. The imaginary line may be generated at a position spaced from the midline by half (W½) of the width (W1) of a vehicle in an opposite lane Lane1 in which there is no vehicle.

The final deflection path may be generated in a form of a curve formed by smoothly connecting the midline of the driving lane Lane2 of the subject vehicle, the midline of the imaginary line generated based on the object a, the midline of the imaginary line generated based on the object b, and the midline of the imaginary line generated based on the object c.

Figure 20:
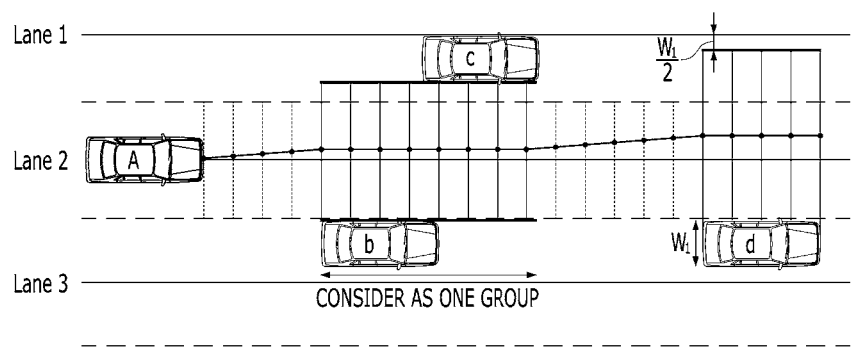

FIG. 20 is a diagram showing an example of a deflection path which is generated when deflection target objects drive in opposite lanes and drive to be spaced from each other by a distance less than a reference distance in a longitudinal direction thereof.

When the longitudinal distances d2 of the deflection target objects b and c that drive in opposite lanes is equal to or greater than the reference distance, the objects b and c may be determined to be one group.

When the objects b and c are determined to be one group, if the objects b and c drive in opposite lanes Lane1 and Lane3 of the driving lane Lane2 of the subject vehicle, imaginary lines may be generated based on the outermost lines of both the vehicles b and c, respectively. Thus, midpoints of the imaginary lines of both the vehicles b and c may be determined.

Because the deflection target vehicle d drives in the right lane Lane3 based on the driving lane Lane2 of the subject vehicle, the imaginary line may be generated based on the outermost line of the deflection target vehicle c. The imaginary line may be generated at a position spaced from the midline by half (W½) of the width (W1) of a vehicle in an opposite lane Lane1 in which there is no vehicle.

The final deflection path may be generated in a form of a curve formed by smoothly connecting the midline of the driving lane Lane2 of the subject vehicle, the midline of the imaginary lines of both the vehicles b and c, and the midline of the imaginary line generated based on the object d.

Figure 21:
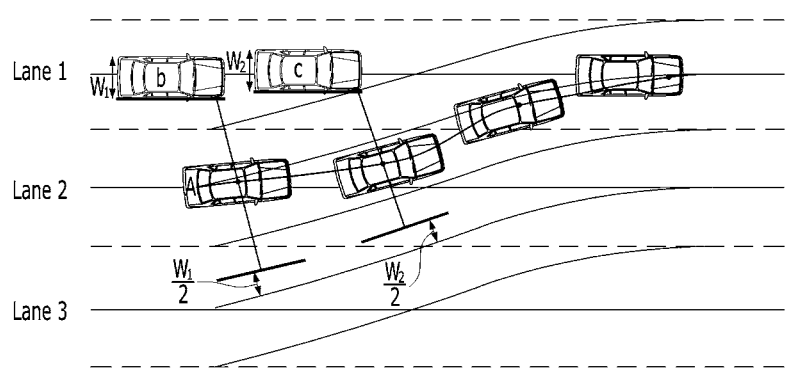

FIG. 21 is a diagram showing an example of a deflection path which is generated when the subject vehicle changes driving lanes.

Referring to FIG. 21, when the subject vehicle changes the driving lanes, a deflection path may be generated by generating the same lane Lane2 as actual detailed map information through symmetrical movement of a control path and determining that the deflection target vehicle b drives in the left lane Lane1 based on the changed lane Lane2 in which the subject vehicle A drives.

Thus, a midline of opposite imaginary lines may be generated as the final deflection path by generating an imaginary line based on the outermost line of the deflection target vehicle b and generating an imaginary line at a position spaced from the midline by half (W½) of the width (W1) of a vehicle in an opposite lane in which there is no vehicle.

Figure 22:
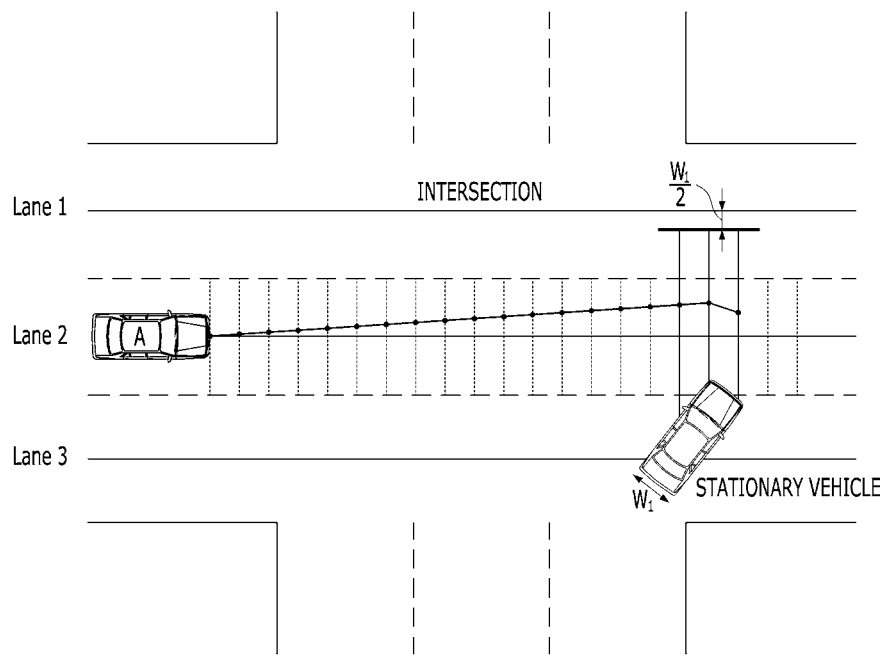

FIG. 22 is a diagram showing an example of a method of generating a deflection path at an intersection.

Referring to FIG. 22, a deflection target vehicle at an intersection may be a stationary vehicle waiting at a stoplight. That is, when the subject vehicle A drives at an intersection, if a deflection target object, that is, a stationary vehicle close to the driving lane Lane2 of the subject vehicle A is detected, the deflection path may be generated in consideration of the deflection target object.

Thus, a midline of opposite imaginary lines may be generated as the final deflection path by generating an imaginary line based on the outermost line of the deflection target vehicle (stationary vehicle) and generating an imaginary line at a position spaced from the midline by half (W½) of the width (W1) of a vehicle in an opposite lane in which there is no vehicle.

As described above, according to various exemplary embodiments of the present invention, a deflection value may be determined using a simple method by selecting a deflection target among nearby driving vehicles of the subject vehicle and determining a deflection value by which the subject vehicle needs to be deflected using an imaginary line parallel to a driving lane of the subject vehicle based on the outermost point of the deflection target object. Thus, even if various vehicles are present in complex patterns, for example, a straight road, a curved road, lane change, and an intersection, it may be possible to perform autonomous driving along a smooth deflection path like manual driving of an actual driver by easily generating the deflection path. Even if a driving environment is changed, for example, in the case of a straight road, a curved road, lane change, and an intersection, the deflection value may be continuously determined based on the distance by which another vehicle deviates from an adjacent lane, the width of a lane, and the width of a vehicle, and the subject vehicle actually passes through the midpoint of the outermost lines of vehicles, thereby ensuring driving stability.

According to the driving control apparatus and method related to at least various exemplary embodiments of the present invention as configured above, a deflection value may be determined using a simple method by determining a deflection value by which the subject vehicle needs to be deflected based on the distance by which another vehicle deviates from an adjacent lane, the width of a lane, and the width of a vehicle. Thus, even if various vehicles are present in complex patterns, it may be possible to perform autonomous driving along a smooth deflection path like manual driving of an actual driver, thereby improving ride comfort.

Even if a driving environment is changed, for example, in the case of a straight road, a curved road, lane change, and an intersection, the deflection value may be continuously determined based on the distance by which another vehicle deviates from an adjacent lane, the width of a lane, and the width of a vehicle, and the subject vehicle actually passes through the midpoint of the outermost lines of vehicles, thereby ensuring driving stability.

It will be appreciated by persons skilled in the art that the effects that could be achieved with the present invention are not limited to what has been described hereinabove and other advantages of the present invention will be more clearly understood from the detailed description.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A driving control method comprising:
    collecting driving information related to a subject vehicle, wherein the driving information related to the subject vehicle includes a driving lane and a vehicle width of the subject vehicle, and driving information related to other vehicle, wherein the driving information related to the other vehicle includes a driving lane and a vehicle width of at least one other vehicle around the subject vehicle;
    generating one or more imaginary lines indicating positions in a corresponding driving lane of the other vehicle according to the driving information related to the other vehicle;
    determining a deflection value by which the subject vehicle needs to be deflected in the driving lane of the subject vehicle based on an imaginary line;
    determining a driving path of the subject vehicle based on the determined deflection value; and
    controlling the subject vehicle based on the determined driving path,
    wherein the generating the one or more imaginary lines includes:
    when the other vehicle drives only in one lane among adjacent lanes to the driving lane of the subject vehicle,
    generating a line passing through a closest point of the other vehicle to the subject vehicle and parallel to the driving lane of the subject vehicle as a first imaginary line in the driving lane in which the other vehicle drives; and
    generating a second imaginary line in an opposite lane symmetric to the first imaginary line with respect to the subject vehicle in a lane in which no vehicle drives.

2. The driving control method of claim 1, further including:
    performing clustering of grouping one or more other vehicles in which the imaginary line is generated into one group according to a predetermined reference and determining a closest imaginary line to the subject vehicle as an imaginary line of a corresponding group among imaginary lines included in the group.

3. The driving control method of claim 2, wherein the performing clustering includes grouping corresponding other vehicles into one group when a distance between the other vehicles is less than a reference distance.

4. The driving control method of claim 2, wherein the performing of the clustering includes grouping the other vehicles into one group when the other vehicles are present in opposite lanes based on the subject vehicle, respectively.

5. The driving control method of claim 2, wherein the performing of the clustering includes grouping the other vehicles into one group when an expected traverse speed of the subject vehicle with respect to each of the other vehicles is greater than a threshold value.

6. The driving control method of claim 1, wherein the generating the one or more imaginary lines includes generating a line passing through the closest point of the other vehicle to the subject vehicle and parallel to the driving lane of the subject vehicle, as the imaginary line.

7. The driving control method of claim 6, wherein the determining the deflection value includes determining a position of a point having a same distance with respect to the first imaginary line generated in one adjacent lane to the driving lane of the subject vehicle and the second imaginary line generated in another adjacent lane to the driving lane of the subject vehicle, as the deflection value.

8. The driving control method of claim 7, further including:
    correcting the determined deflection value based on at least one of a width of the driving lane of the subject vehicle, a width of the driving lane of the other vehicle, a distance between the imaginary line and a corresponding lane, the vehicle width of the subject vehicle, or the vehicle width of the other vehicle.

9. The driving control method of claim 1, wherein the generating the one or more imaginary lines includes:
    when the other vehicle drives in opposite adjacent lanes to the driving lane of the subject vehicle,
    generating the first imaginary line in the other vehicle that approaches the driving lane in which the subject vehicle drives by a distance less than a reference distance in one adjacent lane to the driving lane of the subject vehicle; and
    generating the second imaginary line in the other vehicle that approaches the driving lane in which the subject vehicle drives by a distance less than the reference distance in another adjacent lane to the driving lane of the subject vehicle.

10. The driving control method of claim 1, wherein the determining the driving path includes determining the driving path using any one curve generating method among Bezier Curve, B-spline Curve, NURBS, and cubic spline, which utilizes points forming a midline of the one or more imaginary lines and points forming a midline of the driving lane of the subject vehicle, as a control point.

11. A non-transitory computer-readable recording medium having recorded thereon a program for executing the method of claim 1.

12. A driving control apparatus comprising:
    a first determiner configured to collect driving information related to a subject vehicle, wherein the driving information related to the subject vehicle includes a driving lane and a vehicle width of the subject vehicle, and driving information related to other vehicle, wherein the driving information related to the other vehicle includes a driving lane and a vehicle width of at least one other vehicle around the subject vehicle;

a second determiner configured to generate one or more imaginary lines indicating positions in a corresponding driving lane of the other vehicle based on the driving information related to the other vehicle, to determine a deflection value by which the subject vehicle needs to be deflected in the driving lane of the subject vehicle based on an imaginary line, and to determine a driving path of the subject vehicle based on the deflection value; and a driving controller configured to control of the subject vehicle based on the determined driving path, wherein when the other vehicle drives only in one lane among adjacent lanes to the driving lane of the subject vehicle, an object imaginary line extraction module generates a line passing through a closest point of the other vehicle to the subject vehicle and parallel to the driving lane of the subject vehicle as a first imaginary line in the driving lane in which the other vehicle drives and generates a second imaginary line in an opposite lane symmetric to the first imaginary line in with respect to the subject vehicle in a lane in which no vehicle drives.

13. The driving control apparatus of claim 12, wherein the driving information related to the subject vehicle further includes at least one of position information, speed information, and acceleration information related to the subject vehicle, or a width of the driving lane of the subject vehicle, and wherein the driving information related to the other vehicle further includes at least one of position information, speed information, and acceleration information related to the other vehicle, or a width of the driving lane of the other vehicle, or a vehicle width of the other vehicle.

14. The driving control apparatus of claim 13, wherein the first determiner includes:

a subject vehicle position recognition module configured to output the position information related to the subject vehicle using map information;

a road information combination module configured to output the position information related to the subject vehicle and the map information related to a region around the subject vehicle; and an object combination module configured to combine object information including the subject vehicle and the other vehicle with the map information and to output combined information.

15. The driving control apparatus of claim 13, wherein the second determiner includes:

a deflection target object extraction module configured to extract other vehicle that approaches the driving lane in which the subject vehicle drives by a distance less than a reference distance in an adjacent lane of the driving lane of the subject vehicle as a deflection target object based on a determination result of the first determiner;

the object imaginary line extraction module configured to generate a line passing through a closest point of the other vehicle to the subject vehicle and parallel to a lane of the subject vehicle as the imaginary line;

a deflection target object clustering module configured to group one or more other vehicles in which the imaginary line is generated into one group according to a preset reference; and a deflection path generating module configured to generate a deflection path based on points forming a midline of opposite imaginary lines generated in one adjacent lane and other adjacent lane to the driving lane of the subject vehicle and points forming a midline of the driving lane of the subject vehicle.

16. The driving control apparatus of claim 15, wherein when the other vehicle drives in opposite adjacent lanes to the driving lane of the subject vehicle, the object imaginary line extraction module generates the first imaginary line in other vehicle that approaches the driving lane in which the subject vehicle drives by a distance less than a reference distance in one adjacent lane to the driving lane of the subject vehicle and generates the second imaginary line in other vehicle that approaches the driving lane in which the subject vehicle drives by a distance less than the reference distance in another adjacent lane to the driving lane of the subject vehicle.

17. The driving control apparatus of claim 15, wherein the deflection target object clustering module groups the one or more other vehicles into one group using at least one of a method of grouping corresponding other vehicles into one group when a distance between the other vehicles is less than a reference distance, a method of grouping the other vehicles into one group when the other vehicles are present in opposite lanes based on the subject vehicle, respectively, or a method of grouping the other vehicles into one group when an expected traverse speed of the subject vehicle with respect to each of the other vehicles is greater than a threshold value.

18. A driving control method comprising:

collecting driving information related to a subject vehicle, wherein the driving information related to the subject vehicle includes a driving lane and a vehicle width of the subject vehicle, and driving information related to other vehicle, wherein the driving information related to the other vehicle includes a driving lane and a vehicle width of at least one other vehicle around the subject vehicle;

generating one or more imaginary lines indicating positions in a corresponding driving lane of the other vehicle according to the driving information related to the other vehicle;

determining a deflection value by which the subject vehicle needs to be deflected in the driving lane of the subject vehicle based on an imaginary line;

determining a driving path of the subject vehicle based on the determined deflection value; and controlling the subject vehicle based on the determined driving path, wherein the generating the one or more imaginary lines includes:

when the other vehicle drives only in one lane among adjacent lanes to the driving lane of the subject vehicle, generating a line passing through a closest point of the other vehicle to the subject vehicle and parallel to the driving lane of the subject vehicle as a first imaginary line in the driving lane in which the other vehicle drives; and generating a second imaginary line at a position spaced from a midline of a lane in which no vehicle drives toward the subject vehicle by half of the vehicle width of the other vehicle in the lane in which no vehicle drives.

19. A driving control apparatus comprising:

a first determiner configured to collect driving information related to a subject vehicle, wherein the driving information related to the subject vehicle includes a driving lane and a vehicle width of the subject vehicle, and driving information related to other vehicle, wherein the driving information related to the other vehicle includes a driving lane and a vehicle width of at least one other vehicle around the subject vehicle;

a second determiner configured to generate one or more imaginary lines indicating positions in a corresponding driving lane of the other vehicle based on the driving information related to the other vehicle, to determine a deflection value by which the subject vehicle needs to be deflected in the driving lane of the subject vehicle based on an imaginary line, and to determine a driving path of the subject vehicle based on the deflection value; and a driving controller configured to control of the subject vehicle based on the determined driving path, wherein when the other vehicle drives only in one lane among adjacent lanes to the driving lane of the subject vehicle, an object imaginary line extraction module generates a line passing through a closest point of the other vehicle to the subject vehicle and parallel to the driving lane of the subject vehicle as a first imaginary line in the driving lane in which the other vehicle drives and generates a second imaginary line at a position spaced from a midline of a lane in which no vehicle drives toward the subject vehicle by half of the vehicle width of the other vehicle in the lane in which no vehicle drives.

* * * * *